United States Patent [19]

Reed

[11] Patent Number: 4,918,798

[45] Date of Patent: Apr. 24, 1990

[54] RIVET REMOVAL TOOL

[76] Inventor: Charles R. Reed, P.O. Box 4316, Elkhart, Ind. 46514

[21] Appl. No.: 197,528

[22] Filed: May 23, 1988

[51] Int. Cl.[5] ........................................ B23P 11/00

[52] U.S. Cl. .............................. 29/243.54; 29/243.53; 29/251; 29/252

[58] Field of Search ........... 29/243.53, 243.54, 243.55, 29/426.4, 251, 252; 72/325, 391, 399; 59/7; 403/341, 364

[56] References Cited

U.S. PATENT DOCUMENTS 4,280,339 7/1981 Stuenlsy ............................ 403/364

4,365,401 12/1982 Ogren ...................................... 59/7

FOREIGN PATENT DOCUMENTS 15021 7/1899 United Kingdom ............ 29/243.54

1397543 6/1975 United Kingdom ............ 29/243.53

*Primary Examiner*—Judy Hartman

*Attorney, Agent, or Firm*—Thomas J. Dodd

[57] ABSTRACT

A tool and machine for removing fasteners from a workpiece. The tool includes a two-piece housing with a shaft slidably positioned therein. The upper part of the housing slides relative to the lower part and serves to support the shaft as it is urged into the fastener to dislodge it from the workpiece.

18 Claims, 2 Drawing Sheets

RIVET REMOVAL TOOL

SUMMARY OF THE INVENTION

This invention relates to a fixed fastener removal tool and will have application to a rivet removal tool and machine.

Removal of fixed fasteners, such as rivets, has long presented a difficult problem, particularly in auto repair work such as brake shoe replacement. The force needed to dislodge and remove old rivets to effect repair or replacement required the use of bulky, awkward machines and tools which were often inefficient.

The rivet removal tool of this invention includes a tubular housing and a drive shaft slidably carried within the housing for removing the rivet. The housing includes an upper support which houses the upper part of the drive shaft, and is keyed to the housing to provide support for the pin during the removal process. The tool is housed within a conventional rivet removal machine and provides for effective and safe removal of fixed rivets.

Accordingly, it is an object of this invention to provide for a tool which effectively and safely removes fixed fasteners from a workpiece.

Another object of this invention is to provide for a multiple section rivet removal tool in which the removal shaft is adequately supported against the forces generated during removal.

Another object of this invention is to provide for a rivet removal tool which is easily replaced in the machine when necessary.

Other objects of this invention will become apparent upon a reading of the following description.

BRIEF DESCRIPTION OF THE DRAWINGS

A preferred embodiment of the invention has been depicted for illustrative purposes wherein.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to utilize the invention.

Figure 1:
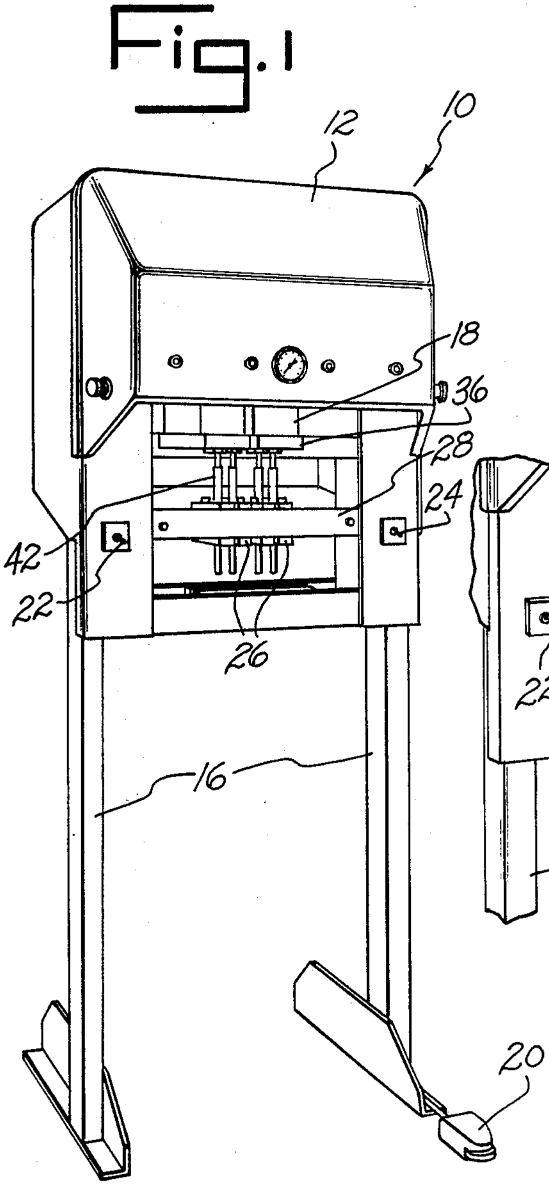
FIG. 1 is a perspective view of a rivet removal machine utilizing the removal tool of this invention.
Figure 2:
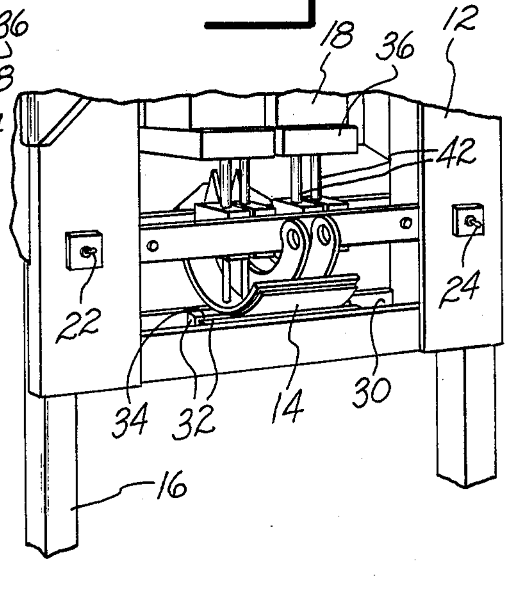
FIG. 2 is a fragmentary perspective view of the machine shown removing rivets from a brake shoe.
Figure 3:
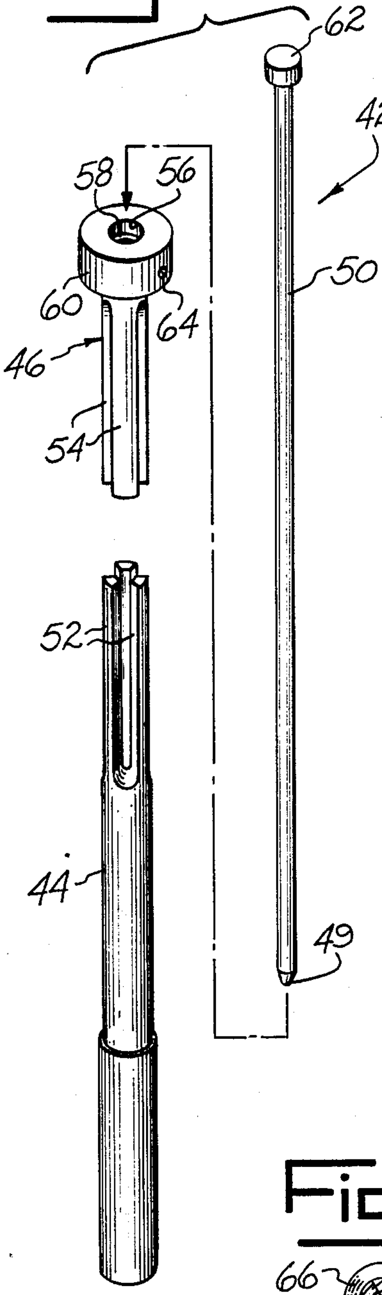
FIG. 3 is an exploded view of the removal tool.

Referring now to FIGS. 1–2, reference numeral 10 refers generally to a fastener removal machine constructed according to the principles of this invention. Machine 10 was initially designed to accomplish removal of fixed rivets from vehicle brake shoes 14, shown in FIG. 2, but is useful in removing other kinds of fasteners from various workpieces as well. Machine 10 includes frame 12 which has legs 16 to support the frame above the ground.

Frame 12 houses one or more platens 18 which are shiftable vertically within the frame by hydraulic cylinders (not shown) activated by foot pedal 20. The nature of the hydraulics and electronics involved in machine 10 are conventional and do not form an integral part of the invention. Use of any suitable hydraulic-electronic components is contemplated which allows up and down shifting movement of platens 18. Switches 22, 24 control respectively the power to machine 10, and to selective movement of one or two (or more, if present) of the platens 18.

Figure 4:
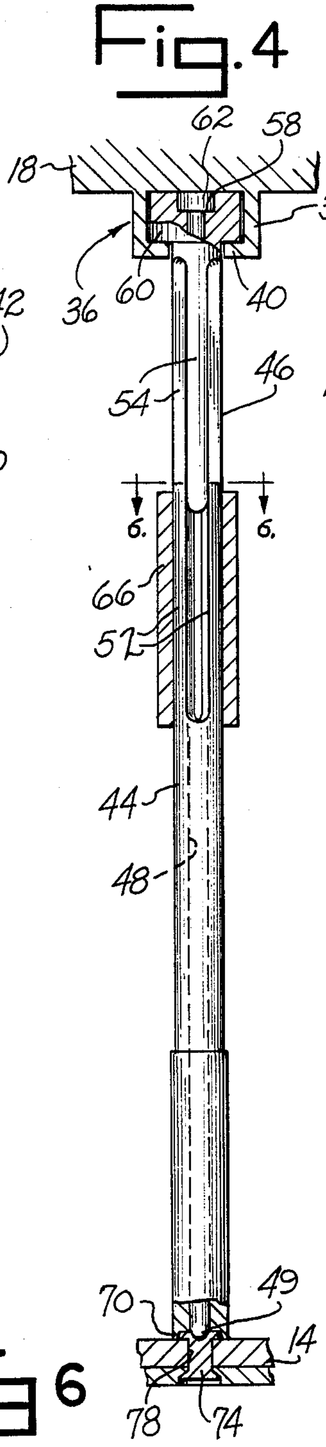
FIG. 4 is a detailed fragmentary elevation view of one of the removal tools just prior to rivet removal, with portions depicted in section for illustrative purposes.
Figure 5:
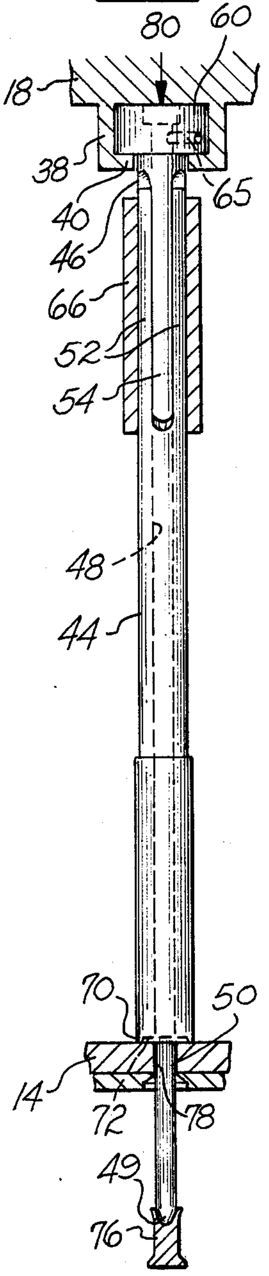
FIG. 5 is a detailed fragmentary elevation view similar to FIG. 4 which illustrates rivet removal.
Figure 6:
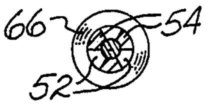
FIG. 6 is a cross-sectional view taken along line 6—6 of FIG. 4.

Frame 12 also houses a plurality of cylinder blocks 26 which are secured in the frame between horizontal frame members 28. Frame 12 further includes a lower trough 30 which includes spaced support bars 32 defining a slot 34. Each platen 18 includes an integral lower channel part 36 defined by depending walls 38 and opposed convergent horizontal flanges 40. One or more fastener removal tools 42, shown in FIGS. 3–6 are fitted in each channel part 36 as shown in FIGS. 4–5. Each tool 42 includes a two-piece housing which has a lower housing part 44 and an upper housing part 46. A continuous bore 48 is defined through housing parts 44, 46 and houses a shaft 50. Housing part 44 includes upper spaced fingers 52 and housing part 46 includes fingers 54. Fingers 52, 54 mate slidably with the spaces between the other housing part to allow housing parts 44, 46 to be connected in a relative sliding fashion.

Housing upper part 46 includes an enlarged head 60 which has a countersunk upper bore 56 which defines shoulder 58 and communicates with bore 48. Shaft 50 includes an enlarged head 62 which fits within bore 56 and abuts shoulder 58 so that the top surfaces of heads 60, 62 are substantially flat when connected, with the shaft extending beyond the terminal end of lower housing part 44. Shaft 50 is secured against relative movement with respect to housing upper part 46 by a set screw 65 or other fastener inserted through horizontal bore 64. A stationary sleeve 66 surrounds housing lower part fingers 52. Housing lower part 44 may also include a portion 68 of increased thickness and includes a lower peripheral lip 70 which defines a recess 72.

FIGS. 4–5 illustrate the removal tool 42 in use. With tool 42 assembled, head 60 is fitted within channel part 36 and housing lower part 44 extends through cylinder block 26 (FIG. 2) and is secured thereto with sleeve 66 resting upon and supported atop the cylinder block. FIG. 4 illustrates the tool 42 in its up position with shaft end 49 terminating in recess 72. In this position, tool 42 is positioned adjacent a fastener to be removed, in the embodiment shown, a rivet 74 from a brake shoe 14 (FIGS. 2 and 4). Rivet 74 is enclosed in recess 72 as shown with shaft 50 positioned over the bore 78 in brake shoe 14.

To remove rivet 74, a user first locates the rivet 74 in recess 72 (FIG. 4) and lowers tools 42 until shaft end 49 abuts the rivet. The user then activates the hydraulics (not shown) preferably by depressing pedal 20 to urge platen 18 in the direction of arrow 80 towards the rivet. Platen 18 and housing upper part 46 together with shaft 50 are driven downwardly with the shaft pushing rivet 74 through bore 78 and into trough slot 34. The interlocking nature of fingers 52, 54 coupled with sleeve 56 provides excellent support against twisting and vibrational forces as shaft end 49 contacts and drives through rivet 74.

Since the pressure required to remove a single rivet is the same for each rivet, the force applied to platens 18 must not exceed the rating for the individual tools 42. In the event both platens 18 are to be utilized, it is preferred that shafts 50 are positioned such that the individual platens 18 operate to remove rivets 74 in a non-simultaneous fashion.

It is understood that the above description does not limit the invention to those precise details but may be modified within the scope of the following claims.

I claim:

1. A tool for removing fasteners from a workpiece, said tool comprising an elongate generally tubular housing, a longitudinal bore having a continuous inner surface defined through said housing, said housing including a lower positioning part, and an upper support part slidably connected to said lower positioning part, means to movably connect said upper support part and said lower positioning part while maintaining said continuous inner surface, a shaft located in said housing bore and supported by said housing upper part, said shaft slidable within said bore relative to said housing lower part and contacting said bore inner surface along the entire length of said bore inner surface to support the shaft, and means for sliding said housing upper part and shaft between a first position wherein a terminal end of said shaft is spaced from a workpiece and a fastener to be removed, and a second position wherein said housing upper part and shaft are urged toward said workpiece with said shaft forcibly contacting said fastener to remove the fastener from the workpiece, shoulder means at an upper end of the bore inner surface, said shaft abutting said shoulder means inner surface at both said first and second positions of the housing to provide constant longitudinal support for the entire length of the shaft whereby the housing supports the entire shaft against vibrational forces transmitted from the lower end of the shaft.

2. The tool of claim 1 wherein said means to movably connect said housing lower part having a plurality of fingers spaced by keyway slots, and said housing upper part having a plurality of depending fingers slidably fitted in said keyway slots to allow longitudinal sliding movement of said housing upper part relative to said housing lower part, said upper part fingers constituting means for preventing rotative movement of the housing upper part relative to the housing lower part.

3. The tool of claim 2 wherein said housing upper part includes an enlarged head, said head defining an enlarged bore communicating with said housing bore and terminating in said shoulder means, said shaft including an enlarged head fitted in said enlarged bore and abutting said shoulder means at said first and second positions.

4. The tool of claim 3 wherein said housing upper part head defines a generally flat upper surface, said shaft head defining an upper flat surface generally flush with said housing upper part head flat surface.

5. The tool of claim 3 and means for securing said shaft to said housing upper part for correlative sliding movement relative to said housing lower part.

6. The tool of claim 2 and a stationary support sleeve surrounding said housing lower part fingers.

7. The tool of claim 1 wherein said housing lower part includes a lower peripheral lip defining a recess, said lip abutting said workpiece with said fastener housed in said recess, said lip and recess constituting means for positioning said shaft with respect to said fastener prior to sliding movement of the shaft and upper housing part.

8. The tool of claim 7 wherein said housing lower part includes a lower portion of increased thickness for strengthening said housing lower part during shifting of said housing upper part and shaft into said second position.

9. A machine for removing fasteners from a workpiece, said machine comprising a frame, a fastener removal tool including a lower housing part secured to said frame, said fastener removal tool further including an upper housing part having a head part slidable relative to said frame, a longitudinal bore having a continuous inner surface defined through said housing upper and lower parts means to movably connect said upper and lower parts while maintaining said continuous inner surface, a shaft restrictively positioned in said bore and supported by said housing upper part, said shaft slidable in said bore relative to said housing lower part and contacting said bore inner surface along the entire length of said bore inner surface to provide constant support for the length of the shaft, said housing upper part removably secured to a platen, and means for effecting movement of said platen to urge said housing upper part and shaft between a first position with a terminal end of said shaft spaced from a workpiece and a fastener to be removed, and a second position with said shaft extending through the workpiece to remove the fastener, said housing upper part constituting means for continuously supporting said shaft at the first and second positions thereof whereby the housing supports the entire shaft against vibrational forces transmitted from the lower end of the shaft.

10. The machine of claim 9 wherein said platen includes a depending channel part having lower opposed flanges, said housing upper head part slidably secured within said channel part.

11. The machine of claim 9 wherein said means to movably connect said housing lower part having a plurality of fingers spaced by keyway slots, and said housing upper part including a plurality of depending fingers slidably fitted in said keyway slots to allow longitudinal sliding movement of said housing upper part relative to said housing lower part, said upper part fingers constituting means for preventing rotative movement of the housing upper part relative to the housing lower part.

12. The machine of claim 11 and a stationary support sleeve surrounding said housing lower part fingers.

13. The machine of claim 11 wherein said housing upper part includes an enlarged head, said head defining an enlarged bore communicating with said housing bore and terminating in a shoulder, said shaft including an enlarged head fitted in said enlarged bore and abutting said shoulder.

14. The machine of claim 12 wherein said housing upper part head defines a generally flat upper surface, said shaft head defining an upper flat surface generally flush with said housing upper part head flat surface.

15. The machine of claim 14 wherein said platen defines a generally flat lower surface contacting said head part surfaces.

16. The machine of claim 11 wherein said means for effecting movement of said platen includes a manually operable foot pedal means for controlling movement of the platen.

17. The machine of claim 11 wherein said housing lower part includes a lower peripheral lip defining a recess, said lip abutting said workpiece with said fastener housed in said recess, said lip and recess constituting means for positioning said shaft with respect to said fastener prior to sliding movement of the shaft and upper housing part.

18. The machine of claim 11 wherein said frame includes a table for supporting said workpiece, said table defining grooves to accommodate said shaft when urged into its second position through said workpiece.

* * * * *